United States Patent [19]

Culbertson

[11] Patent Number: 4,768,288
[45] Date of Patent: Sep. 6, 1988

[54] SALAD TONGS
[75] Inventor: William H. Culbertson, Ashland, Ky.
[73] Assignee: World Tableware International, Inc., Wallingford, Conn.
[21] Appl. No.: 899,726
[22] Filed: Aug. 25, 1986
[51] Int. Cl.$^4$ .............................................. B25F 3/00
[52] U.S. Cl. ......................................... 30/142; 294/3; 294/33
[58] Field of Search ...................... 30/323, 142; 294/3, 294/5, 8.5, 11, 15, 16; D7/105
[56] References Cited

U.S. PATENT DOCUMENTS

| 2,554,255 | 5/1951 | Lorell | 30/323 |
| 4,093,297 | 6/1978 | Reiber | 294/8.5 X |
| 4,199,180 | 4/1980 | Kelly | D7/105 X |

FOREIGN PATENT DOCUMENTS 1093186 11/1954 France ..................................... 294/3

Primary Examiner—E. R. Kazenske
Assistant Examiner—Willmon Fridie, Jr.
Attorney, Agent, or Firm—Hayes & Reinsmith

[57] ABSTRACT

A salad tong having a pair of resilient gripping arms and a hand guard assembly. The hand guard assembly may be in the form of a U-shaped guard having a front wall with the rear ends of the tong extending through a slot therein and having a rear wall with a slot through which the rear end of the salad tong extends, with a locking pin to hold the salad tongs in position. Alternately, the hand guard assembly is in the form of a separate hand grip on each arm.

11 Claims, 2 Drawing Sheets

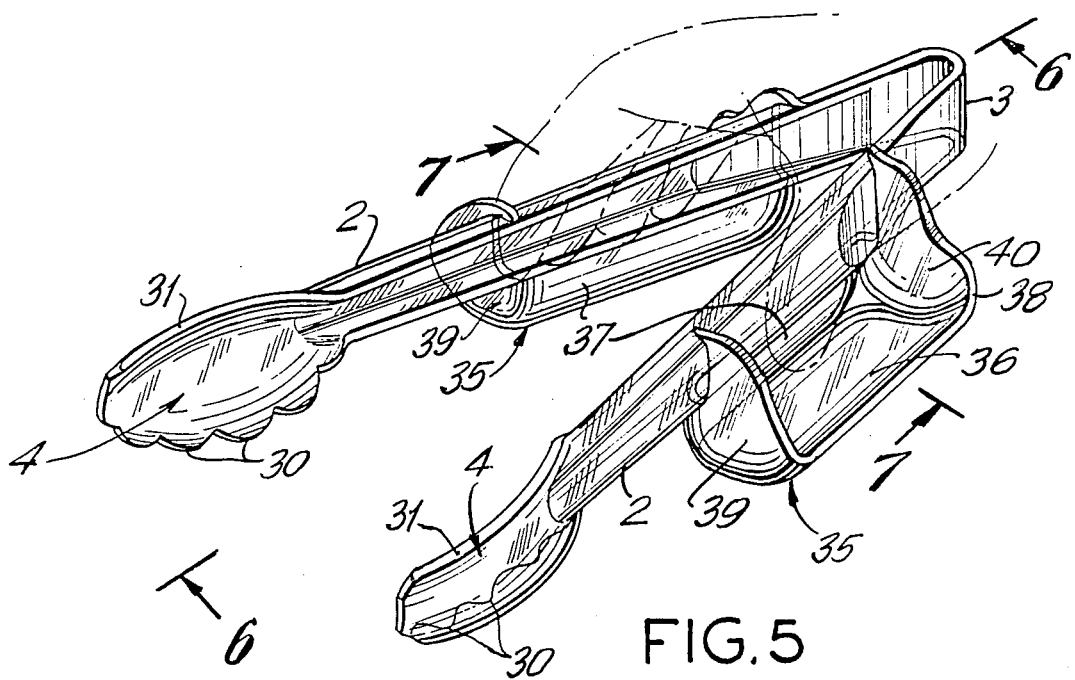
FIG.5
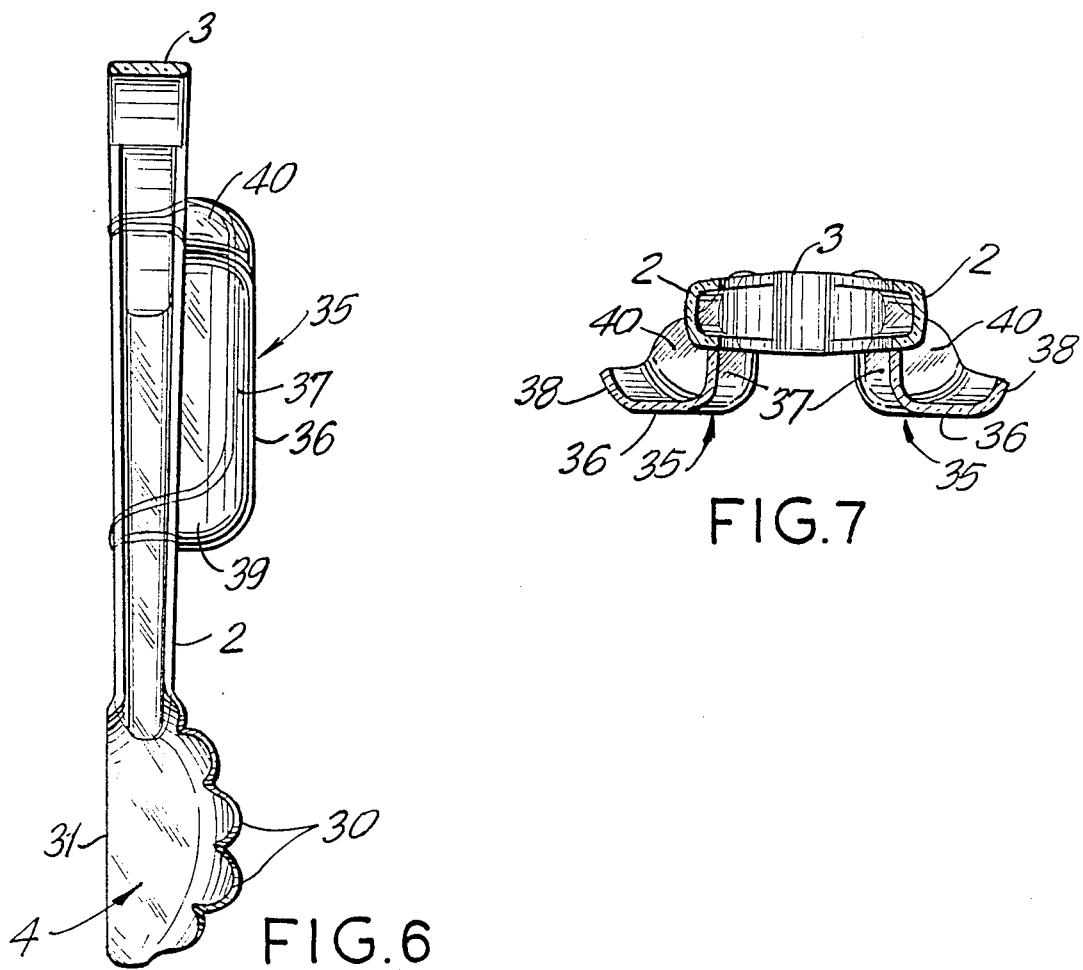
FIG.7
FIG.6

SALAD TONGS

DESCRIPTION

The present invention relates to salad tongs and, more particularly, to improved salad tongs adapted to be used for grasping salad from large salad bowls.

In salad bars, large salad bowls filled with lettuce, tomatoes, etc., are often used. The consumer takes a portion of the salad from the large salad bowl and places it in his plate. Large salad forks and spoons are sometimes provided for the consumer to use in order to take his portion of the salad. Large salad tongs are also provided in some restaurants, which each user manipulates to grasp a portion of the salad from the salad bowl.

It has been found that such large salad tongs, as well as large salad forks and spoons, are often placed by the consumer inside the bowl so that the tongs become covered with the salad ingredients. In addition, the user's hand sometimes becomes immersed in the salad ingredients while he is grasping a salad portion so that the user's hand may be soiled and/or the salad may become contaminated.

The present invention avoids these drawbacks and has for one of its objects the provision of improved salad tongs having a shield which prevents the user's hand from becoming soiled and also prevents the user's hand from contaminating the salad.

Another object of the present invention is the provision of improved salad tongs which are easy to use and manipulate.

Another object of the present invention is the provision of improved salad tongs which are easy to manufacture.

Another object of the present invention is the provision of improved salad tongs which provide a gripping area around which the user will grip the tongs.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification wherein:

FIG. 5 is a perspective view showing another embodiment of the present invention.

FIG. 6 is a sectional view taken along line 6—6 of FIG. 5.

FIG. 7 is a sectional view taken along line 7—7 of FIG. 5.

Figure 1:
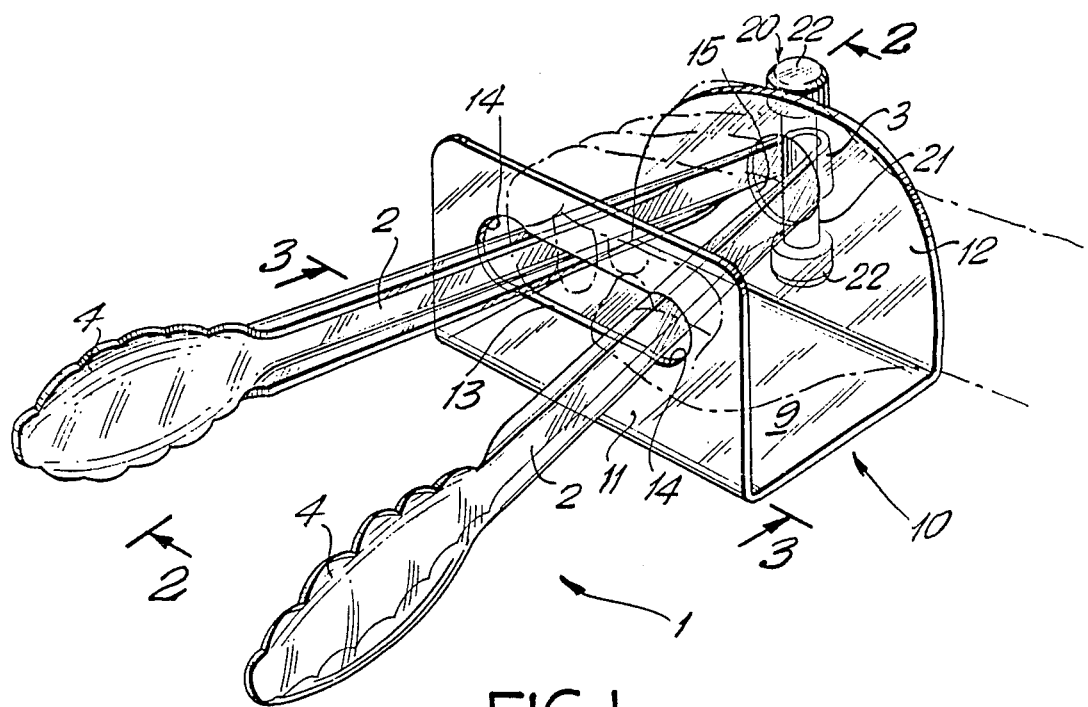
FIG. 1 is a perspective view showing the improved salad tong of the present invention.
Figures 2, 3:
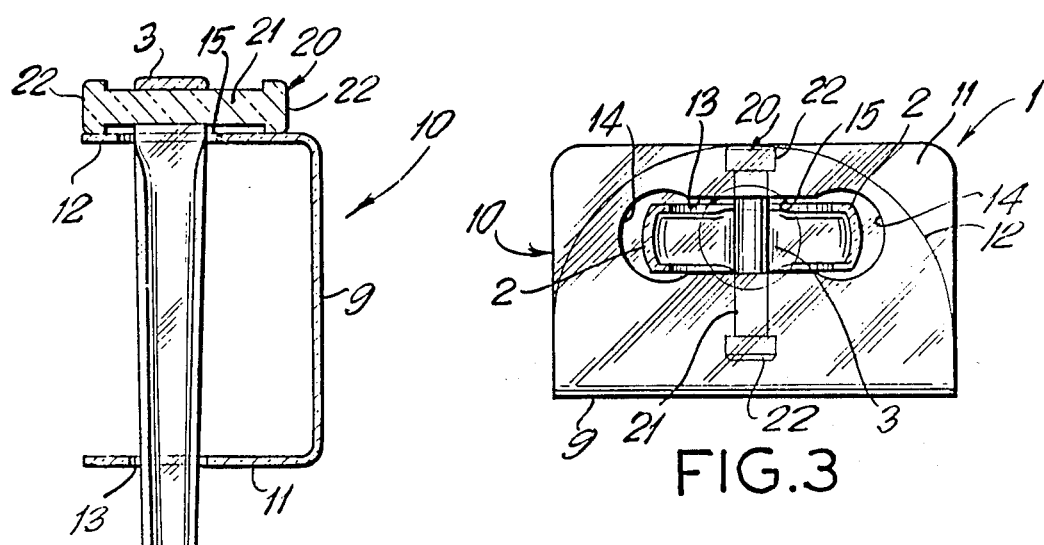
FIG. 2 is a side view thereof along line 2—2 of FIG. 1.
FIG. 3 is a front view thereof, along line 3—3 of FIG. 1.
Figure 4:
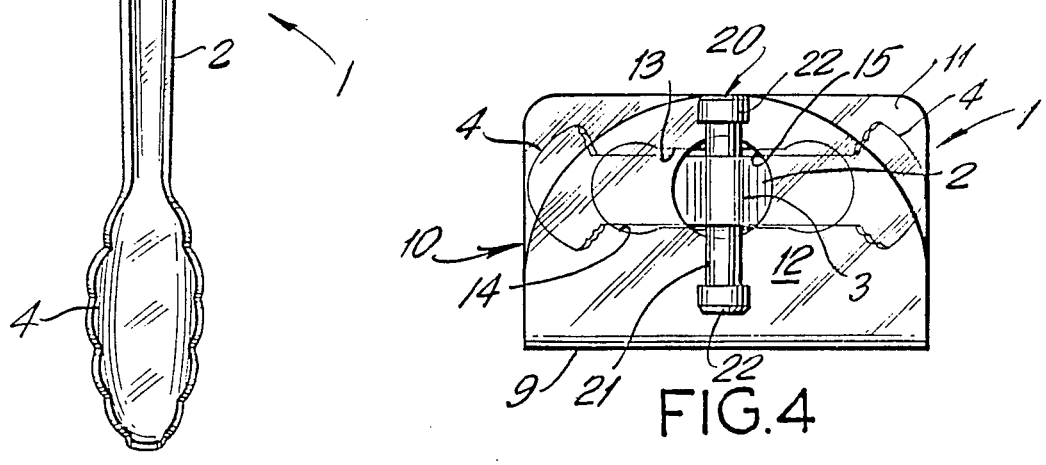
FIG. 4 is a rear view thereof.

Referring to the drawings, and more particularly to FIGS. 1 through 4, the salad tongs of the present invention comprise a pair of arms 2 which are spring-pressed and moveable relative to each other along a rear fulcrum 3. Preferably, the arms 2 are made from a one-piece resilient material, such as plastic and are bent relative to each at the rear fulcrum 3. Each arm 2 is biased in an outward direction so that after the arms 2 are pressed together and released, they will spring open automatically. The front end of each arm 2 is provided with the usual gripping jaw 4. Although the salad tongs 1 have been shown in the drawing as being a single piece, it is within the purview of the present invention to make the arms 2 from separate pieces.

A hand guard assembly 10 is provided for the salad tongs. The hand guard assembly 10 comprises a front wall 11 and a rear wall 12 substantially and, preferably, parallel to each other and connected together by a bottom wall 9 which is preferably perpendicular to the front and rear walls 11 and 12. The space between the front and rear walls 11 and 12 is sufficient for the consumer to insert his hand in order to grasp the tong arms 2. The front wall 11 has an elongated horizontally-oriented opening or slot 13 through which the arms 2 of the salad tongs 1 extend. The edges 14 of the slot 13 are curved and are slightly higher than the height of the slot 13 to accomodate the tong arms 2. The rear wall 12 has a smaller, preferably circular opening or slot 15 adapted to receive the rear apex or fulcrum 3 of the salad tongs 1 therethrough. The two slots 13 and 14 are preferably in alignment with each other so that the arms 2 of the tongs 1 can be inserted through the slot 13 in the front wall 11 and passed across the space between the front and rear walls 11 and 12 and slot 15 in the rear wall 12, as shown in FIG. 1.

In order to permit the salad tongs to remain in place, a lock pin 20 is provided which is positioned on the inner side of the rear fulcrum or apex 3 of the salad tongs 1 and on the rear surface of the rear wall 12 to hold the salad tongs in place. The lock pin 20 is preferably a round shaft 21 mounted at right angles to the plane of the salad tongs 1 and having enlarged stop knob 22 at each end. The pin 20 straddles the opening 15 so as to prevent any forward movement of the tongs. The small size of the rear opening 15 will prevent any rearward movement of the arms 2 and the resilient outwardly biased nature of the arms will bias the salad tongs 1 in a forward direction so that the pin 20 is pressed against the rear wall. In this position, the knobs 22 prevent the pin from falling out.

In use, the user grasps the arms 2 of the tongs between the front and rear walls 11 and 12 of the guard assembly 10. The front wall 11 will shield the user's hand from coming in contact with the salad in the salad bowl. Therefore, the salad will remain uncontaminated and the user's hand will not soil. When the user finishes filling his plate, he puts the salad tongs down and the arms 2 will automatically spring back to the open position.

FIGS. 5 thorugh 7 show another, and preferred, embodiment of the present invention.

In this embodiment, the gripping jaws 4 which extend from each of the arms 2 have gripping fingers 30 extending from one edge with the opposite edge 31 substantially flat and on the same level as the upper edge of the arms 2. The arms 2 are provided with hand grips 35 which are U-shaped to accomodate the fingers of the user. Each hand grip 35 comprises a lower portion 36 and opposed side portions 37 and 38 as well as front and rear walls 39 and 40, respectively, to shield the user's hand from the contents of the salad bowl. Each hand grip 35 is of sufficient depth and length so that the user's fingers are fully shielded from the contents of the bowl. Preferably, the depth of each hand grip 35 is approximately the same as the depth of the fingers 30.

It will thus be seen that the present invention provides improved salad tong having a shield which prevents the user's hand from contaminating the salad, which is easy to use, manipulate and manufacture, and which provides a shielded gripping area around which the user will grip the tongs.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property of privilege is claimed are defined as follows:

1. Salad tongs comprising a pair of resilient gripping arms each arm having a front jaw and a rear end, a hand guard assembly, said hand guard assembly having a front wall, the arms of the tong extending through a slot in said front wall, means to prevent the arms from moving out of the slot in the front wall, said hand guard assembly having a rear wall having a slot through which the said rear ends of the arms extend.

2. Salad tongs as claimed in claim 1 wherein the slots in the rear and front walls are in alignment with each other.

3. Salad tongs as claimed in claim 2 wherein the rear ends of the arms are operatively connected to each other to form a fulcrum and wherein a locking pin is provided on the inner surface of the rear wall to hold the salad tong in place.

4. Salad tongs as claimed in claim 3 wherein said locking pin straddles the slot in the rear wall.

5. Salad tongs as claimed in claim 4 wherein said locking pin has a pair of end knobs to prevent the pin from slipping out of the fulcrum.

6. Salad tongs as claimed in claim 5 wherein said hand guard has a bottom wall connecting the rear and front walls and substantially at right angles thereto.

7. Salad tongs as claimed in claim 6 wherein said pin is perpendicular to the bottom wall.

8. Salad tongs as claimed in claim 7 wherein said rear slot is circular.

9. Salad tongs as claimed in claim 8 wherein said front slot is elongated.

10. Salad tongs as claimed in claim 9 wherein the ends of the front slot are circular.

11. Salad tongs as claimed in claim 10 wherein said arms are one piece joined together at said fulcrum and resiliently mounted to each other.

* * * * *